United States Patent
Slavens et al.

(10) Patent No.: US 10,563,583 B2
(45) Date of Patent: Feb. 18, 2020

(54) BORE-COOLED FILM DISPENSING PEDESTALS

(71) Applicant: UNITED TECHNOLOGIES CORPORATION, Hartford, CT (US)

(72) Inventors: Thomas N. Slavens, Vernon, CT (US); Brooks E. Snyder, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 579 days.

(21) Appl. No.: 15/022,990

(22) PCT Filed: Oct. 16, 2014

(86) PCT No.: PCT/US2014/060801
§ 371 (c)(1),
(2) Date: Mar. 18, 2016

(87) PCT Pub. No.: WO2015/065718
PCT Pub. Date: May 7, 2015

(65) Prior Publication Data
US 2016/0208705 A1    Jul. 21, 2016

Related U.S. Application Data

(60) Provisional application No. 61/897,261, filed on Oct. 30, 2013.

(51) Int. Cl.
*F02C 7/18* (2006.01)
*F01D 5/18* (2006.01)
(Continued)

(52) U.S. Cl.
CPC ............... *F02C 7/18* (2013.01); *F01D 5/186* (2013.01); *F01D 5/187* (2013.01); *F01D 11/08* (2013.01);
(Continued)

(58) Field of Classification Search
CPC .......... F01D 5/186; F01D 5/187; F01D 11/08; F01D 25/30; F01D 25/12; F23R 3/002;
(Continued)

(56) References Cited

U.S. PATENT DOCUMENTS

| 5,498,133 A | 3/1996 | Lee |
| 6,170,266 B1 | 1/2001 | Pidcock et al. |

(Continued)

FOREIGN PATENT DOCUMENTS

EP    0742347    11/1996

OTHER PUBLICATIONS

International Preliminary Report on Patentability for International Application No. PCT/US2014/060801 dated May 12, 2016.
(Continued)

*Primary Examiner* — Mark A Laurenzi
*Assistant Examiner* — Loren C Edwards
(74) *Attorney, Agent, or Firm* — Carlson, Gaskey & Olds, P.C.

(57) ABSTRACT

A cooling circuit for a gas turbine engine comprises a first wall having a first surface facing a first cavity and a second surface facing away from the first cavity. A second wall is spaced outwardly of the second surface of the first wall to provide at least one second cavity. Cooling fluid is configured to flow from the first cavity and exit to an external surface of the second wall via at least one hole to provide cooling to the external surface. A gas turbine engine and a method of forming a cooling circuit for a gas turbine engine are also disclosed.

23 Claims, 4 Drawing Sheets

(51) Int. Cl.
  *F23R 3/06* (2006.01)
  *F23R 3/00* (2006.01)
  *F01D 11/08* (2006.01)
  *F01D 25/30* (2006.01)
  *F23R 3/04* (2006.01)

(52) U.S. Cl.
  CPC .............. *F01D 25/30* (2013.01); *F23R 3/002* (2013.01); *F23R 3/005* (2013.01); *F23R 3/04* (2013.01); *F23R 3/06* (2013.01); *F05D 2240/305* (2013.01); *F05D 2260/202* (2013.01); *F05D 2260/204* (2013.01); *F23R 2900/03042* (2013.01); *F23R 2900/03044* (2013.01); *Y02T 50/676* (2013.01)

(58) Field of Classification Search
  CPC .... F23R 3/005; F23R 3/04; F23R 3/06; F23R 2900/03042; F23R 2900/03044; F05D 2240/305; F05D 2260/202; F05D 2260/204; Y02T 50/676; F02C 7/18
  USPC .......................................................... 60/806
  See application file for complete search history.

(56) References Cited

U.S. PATENT DOCUMENTS

| 2003/0123953 | A1* | 7/2003 | Razzell ................. F01D 25/243 411/419 |
| 2005/0111979 | A1 | 5/2005 | Liang |
| 2005/0247425 | A1* | 11/2005 | Devine, II ............... B22C 9/10 164/76.1 |
| 2008/0240919 | A1 | 10/2008 | Liang |
| 2009/0028703 | A1 | 1/2009 | Devore et al. |
| 2010/0104419 | A1* | 4/2010 | Liang ..................... F01D 5/186 415/115 |
| 2011/0076182 | A1* | 3/2011 | Suzuki ................. C22C 19/057 420/448 |

OTHER PUBLICATIONS

Supplementary European Search Report for European Application No. 14857390.0 dated May 2, 2017.
International Search Report from corresponding PCT/US14/60801.

* cited by examiner

BORE-COOLED FILM DISPENSING PEDESTALS

CROSS-REFERENCE TO RELATED APPLICATION

This application claims priority to U.S. Provisional Application No. 61/897,261, filed Oct. 30, 2014

BACKGROUND OF THE INVENTION

In pursuit of higher engine efficiencies, higher turbine inlet temperatures have been relied upon to boost overall engine performance. This can result in gas path temperatures that may exceed melting points of turbine component constituent materials. To address this issue, dedicated cooling air is extracted from a compressor section and is used to cool the gas path components in the turbine, such as rotating blades and stator vanes for example, incurring significant cycle penalties.

One method of cooling turbine airfoils utilizes internal cooling passages and/or a baffle. Typically, film cooling holes and significant volumes of cooling air are required to provide the needed amount of cooling. To augment the internal cooling, the internal cooling passages have been configured to include treatments such as pedestals, air jet impingement, and turbulator treatment for passage walls. Pedestals are typically used to augment the two dimensional flow field for cooling passages that have very thin sections, such as double-wall cavities for example.

Another method provides an augmentation of the surface area available for cool-side heat transfer. One example of this method is the use of pins for a backside of a combustor panel. One disadvantage of using pins and pedestals is that these structures need to be kept with a normal direction toward a pull-plane of the casting dies. In a configuration with pedestals in a stamped metallic core, this means that the pedestals will always be normal to the cavity flow direction commensurate with the action pressing the core.

SUMMARY OF THE INVENTION

In a featured embodiment, a cooling circuit for a gas turbine engine has a first wall with a first surface facing a first cavity and a second surface facing away from the first cavity. A second wall is spaced outwardly of the second surface of the first wall to provide at least one second cavity. Cooling fluid is configured to flow from the first cavity and exit to an external surface of the second wall via at least one hole to provide cooling to the external surface.

In another embodiment according to the previous embodiment, at least one pedestal has a first end connected to the first wall and a second end connected to the second wall. At least one pedestal includes at least one internal cooling channel that fluidly connects the first cavity to the external surface.

In another embodiment according to any of the previous embodiments, the at least one internal cooling channel extends across the second cavity and exits at the at least one hole.

In another embodiment according to any of the previous embodiments, at least one pedestal comprises a plurality of pedestals with at least one pedestal of the plurality of pedestals having at least one internal cooling channel that exits to the external surface via at least one hole such that cooling fluid has a first flow path that flows around the pedestals and a second flow path that flows through the pedestals.

In another embodiment according to any of the previous embodiments, the first flow path comprises at least one of an axial or radial flow. The second flow path is orientated at an oblique angle relative to the first flow path.

In another embodiment according to any of the previous embodiments, the second wall is configured to provide an airfoil section.

In another embodiment according to any of the previous embodiments, the first wall comprises an internal wall and the first cavity comprises a center cavity. The second wall comprises an outer wall and the second cavity comprises an outer wall cavity. At least one hole comprises at least one film cooling hole.

In another embodiment according to any of the previous embodiments, the outer wall with the at least one film cooling hole comprises a hot exterior surface of an airfoil.

In another embodiment according to any of the previous embodiments, a plurality of pedestals each has a first end associated with the interior wall and a second end associated with the outer wall. At least one pedestal of the plurality of pedestals includes at least one internal cooling channel having at least one end open to the center cavity and at least one opposite end open to the external surface via a corresponding film cooling hole.

In another embodiment according to any of the previous embodiments, the first wall defines a first combustor panel portion and the second wall defines a second combustor panel portion.

In another embodiment according to any of the previous embodiments, the at least one pedestal includes a plurality of pedestals with at least one pedestal of the plurality of pedestals having a first end connected to the first combustor panel portion and a second end connected to the second combustor panel portion. At least one pedestal includes at least one internal cooling channel having at least one end open to the first cavity and at least one opposite end open to the external surface of the second combustor panel portion via at least one hole.

In another embodiment according to any of the previous embodiments, at least one hole comprises a plurality of film cooling holes, and includes a plurality of impingement cooling holes that are separate from the film cooling holes.

In another embodiment according to any of the previous embodiments, the impingement cooling holes define a first flow direction. The film cooling holes define a second flow direction that is obliquely orientated relative to the first flow direction.

In another featured embodiment, a gas turbine engine has a compressor section, a combustor section downstream of the compressor section, and a turbine section downstream of the combustor section. At least one of the combustor section and the turbine section include a component having a first wall with a first surface facing a first cavity and a second surface facing away from the first cavity, and a second wall spaced outwardly of the second surface of the first wall to provide at least one second cavity. Cooling air is configured to flow from the first cavity and exit to an external surface of the second wall via at least one hole to provide cooling to the external surface.

In another embodiment according to the previous embodiment, the component comprises an airfoil.

In another embodiment according to any of the previous embodiments, the component comprises a combustor panel, blade outer air seal, airfoil platform, or turbine exhaust duct.

In another embodiment according to any of the previous embodiments, at least one pedestal has a first end connected to the first wall and a second end connected to the second wall. At least one pedestal includes at least one internal cooling channel that fluidly connects the first cavity to the external surface.

In another embodiment according to any of the previous embodiments, at least one pedestal includes a plurality of pedestals with at least one pedestal of the plurality of pedestals having at least one internal cooling channel that exits to the external surface via at least one hole such that cooling fluid has a first flow path that flows around the pedestals and a second flow path that flows through the pedestals.

In another featured embodiment, a method of forming a cooling circuit for a gas turbine engine includes the following steps. A first wall is formed to have a first surface facing a first cavity and a second surface facing away from the first cavity. A second wall is formed to be spaced outwardly of the second surface of the first wall to provide at least one second cavity. A plurality of pedestals is formed to extend between the first and second walls, with at least one pedestal of the plurality of pedestals having at least one internal cooling channel. At least one hole is formed in an external surface of the second wall for each internal cooling channel such that cooling air is configured to flow from the first cavity, through each internal cooling channel, and then exit from an associated hole to provide cooling to the external surface. A manufacturing process is used to create a negative for casting of features for at least one of the steps described above.

In another embodiment according to the previous embodiment, the manufacturing process includes successively adding layers of metal powder to form at least a portion of the cooling circuit.

In another embodiment according to any of the previous embodiments, the manufacturing process includes providing an injection molded ceramic core or stamped refractory metal negative for at least one of the steps (a)-(d).

In another embodiment according to any of the previous embodiments, the manufacturing process includes direct additive construction of at least one of the steps (a)-(d).

The foregoing features and elements may be combined in any combination without exclusivity, unless expressly indicated otherwise.

These and other features may be best understood from the following drawings and specification.

DETAILED DESCRIPTION

Figure 1:
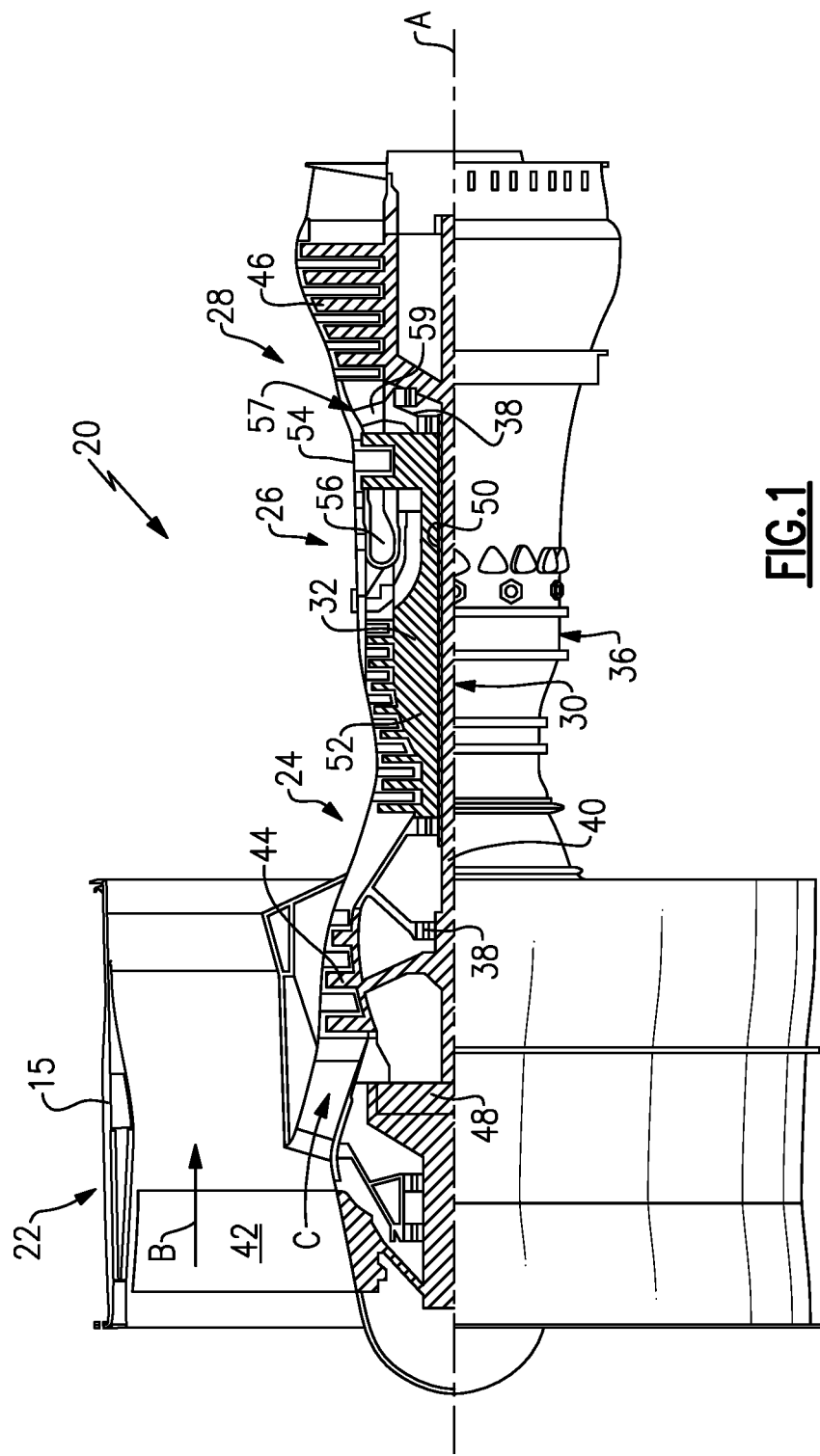
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° R)/(518.7° R)]^{0.5}$. The "Low corrected fan tip speed" as disclosed herein according to one non-limiting embodiment is less than about 1150 ft/second.

Figure 2:
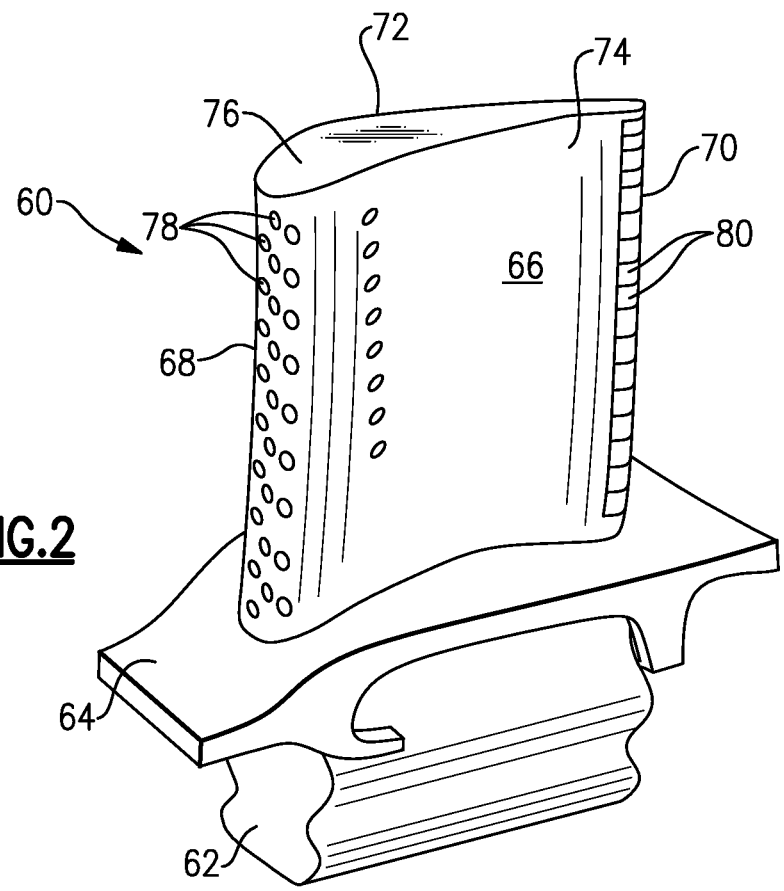
FIG. 2 is a side perspective view of a turbine blade.

Airfoils located downstream of combustor section 26, such as stator vanes and rotor blades in the turbine section 28, for example, operate in a high-temperature environment. Airfoils that are exposed to high temperatures typically include internal cooling channels that direct a flow of cooling air through the airfoil to remove heat and prolong the useful life of the airfoil. FIG. 2 is a side view of a turbine rotor blade 60 having a root section 62, a platform 64, and an airfoil section 66. Root section 62 is connected to a rotor in the turbine section 28 (FIG. 1) as known. The airfoil section 66 includes a leading edge 68, a trailing edge 70, a suction side wall 72, and a pressure side wall 74. The airfoil section 66 extends to a tip 76, and includes a plurality of surface cooling holes, such as film cooling holes 78, and a plurality of trailing edge cooling slots 80.

The platform 64 connects one end of airfoil section 66 to root section 62. The leading edge 68, trailing edge 70, suction side wall 72, and pressure side wall 74 extend outwardly away from the platform 64. The tip 76 closes off an opposite end of the airfoil section 66 from the platform 64. Suction side wall 72 and pressure side wall 74 connect leading edge 68 and trailing edge 70. Film cooling holes 78 are arranged over a surface of airfoil section 66 to provide a layer of cool air proximate the surface of airfoil section 66 for protection from high-temperature combustion gases. Trailing edge cooling slots 80 are arranged along trailing edge 70 to provide an exit for air circulating within airfoil section 66.

Figure 3:
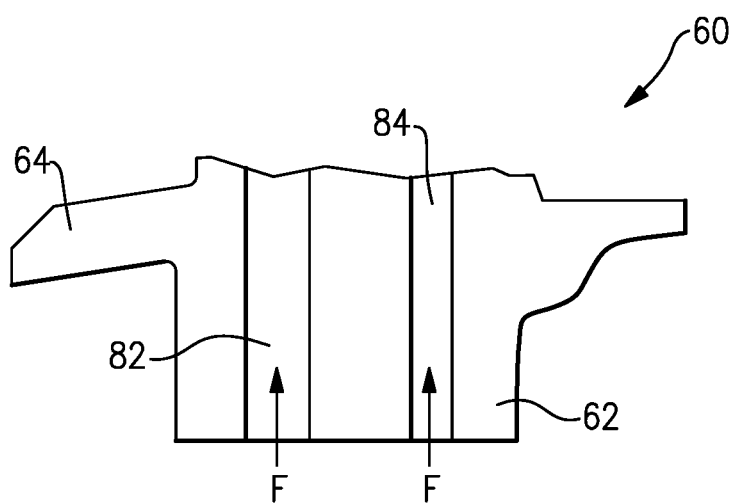
FIG. 3 is a schematic cross-sectional view of a root section of the blade of FIG. 2.

FIG. 3 is a schematic section view of the root section 62 of the rotor blade 60 of FIG. 2. The rotor blade 60 includes one or more internal cooling channels. In the example shown, there is at least a first cooling channel 82 near the leading edge 68, and a second cooling channel 84 positioned aft of the first cooling channel 82. The cooling channels 82, 84 direct cooling flow F radially outwardly toward the tip 76 of the blade 60. The cooling channels 82, 84 deliver cooling flow to the film cooling holes 78 and the cooling slots 80.

Figure 4:
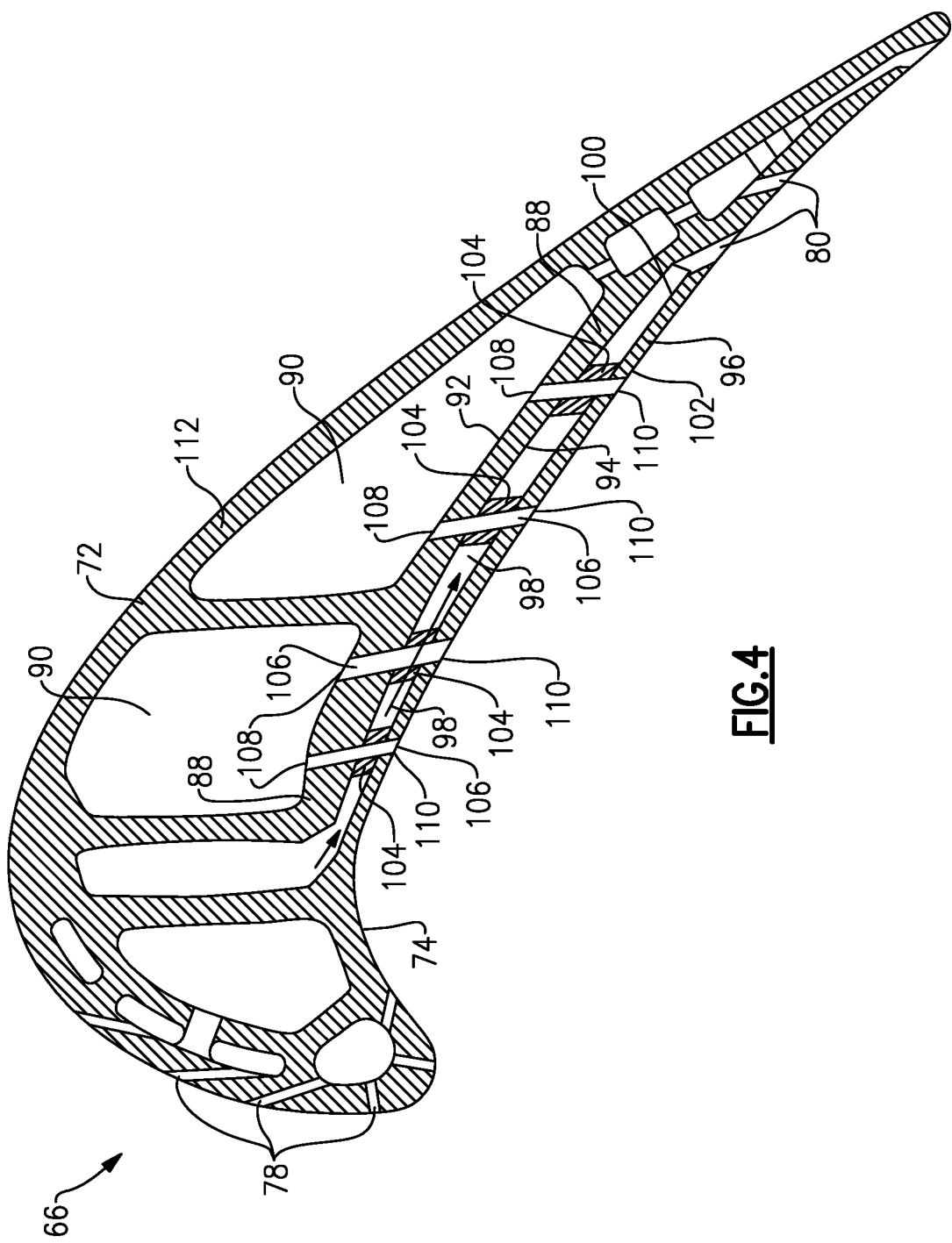
FIG. 4 is a cross-sectional view of an airfoil section of the blade of FIG. 2.

The airfoil section 66 of the blade 60 includes a cooling circuit that is shown in greater detail in FIG. 4. The airfoil section 66 comprises a double-wall configuration that includes a first or interior wall 88 that faces one or more first or central cavities 90. The interior wall 88 has a first surface 92 that faces the central cavity 90 and an opposite second surface 94 that faces away from the cavity 90. The airfoil section 66 includes a second or outer wall 96 spaced outwardly of the interior wall 88 to provide one or more outer cavities 98. The outer wall 96 has a first surface 100 that faces the outer cavities 98 and a second or exterior surface 102 that forms an outer surface of the component.

One or more pedestals 104 are formed to extend between the interior wall 88 and the outer wall 96. The pedestals 104 can be formed to have any desired cross-sectional shape such as circular, oval, square, rectangular, etc. A first end of the pedestal 104 is connected to, or is formed as part of, the interior wall 88, and an opposite second end of the pedestal 104 is connected to, or is formed as part of, the outer wall 96. Each pedestal 104 includes an internal cooling channel 106. Holes or openings 108 are formed within the interior wall 88 and are aligned with the internal cooling channel 106 at the first end of the pedestal 104. Film holes 110 are formed within the outer wall 96 and extend to the exterior surface 102. An outlet from each internal cooling channel 106 at the second end of the pedestal 104 is aligned with one of the film holes 110.

The central cavities 90 and the outer cavities 98 receive cooling fluid flow F from one or more of the internal cooling channels 82, 84 that extend radially outwardly from the root section 62. The cooling fluid is configured to interface with the pedestals 104 via at least two discrete flow paths. Cooling fluid flows through the outer cavity 98 around the pedestals 104 via a first flow path, which exits the blade 60 via the cooling slots 80. Cooling fluid is also configured to flow through the pedestals 104 from the center cavity 90 and then exits to the external surface 102 of the outer wall 96 via the film holes 110 to provide film cooling to the external surface 102 via a second flow path. Cooling fluid also exits the blade 60 from the cooling holes 78.

In the example shown in FIG. 4, the pedestals 104 are orientated to extend across the outer cavities 98 to define a plurality of discrete flow paths from the central cavities 90 to the exterior surface 102 of the airfoil section 66. Thus, the internal cooling channels 106 are configured to extend through both the interior wall 88 and outer wall 96 and to exit at the pressure side 74 of the air foil section 66. A second outer wall portion 112, spaced on an opposite side of the central cavities 90 from the outer wall 96, forms the suction side 72 of the airfoil section 66.

In this example, the outer cavities 98 on the pressure side 74 are supplied by cooling flow from the radially extending channels 82, 84 with the direction of the cooling flow through the outer cavities 98 being from the forward end to the aft end of the airfoil section 66. This is traditionally referred to as "axial flowing." As the fluid flows in this direction, it flows around the pedestals 104 and picks up a large amount of heat. The internal cooling channels 106 of the pedestals provide an extra surface of heat flux to the axially flowing cooling air that is at, or close to, the original coolant source temperature. Further, the fluid that would typically have been ejected from the outer wall cavities 98 as film cooling is retained, and the bore cooling flow through the pedestals 104 via the channels 106 is instead used for film cooling. This allows the further benefit of retaining high backflow margin (BFM) across the film holes and allows the outer wall cavity outflow margin (OFM) to draw lower than the traditional criteria, in turn allowing a significant increase in the maximum Mach number through the outer wall cavity 98. BFM is the difference between the fluid pressure of the coolant fluid in the internal channels of the blade and the local static pressure at, for example, a film cooling exhaust hole.

Figure 5:
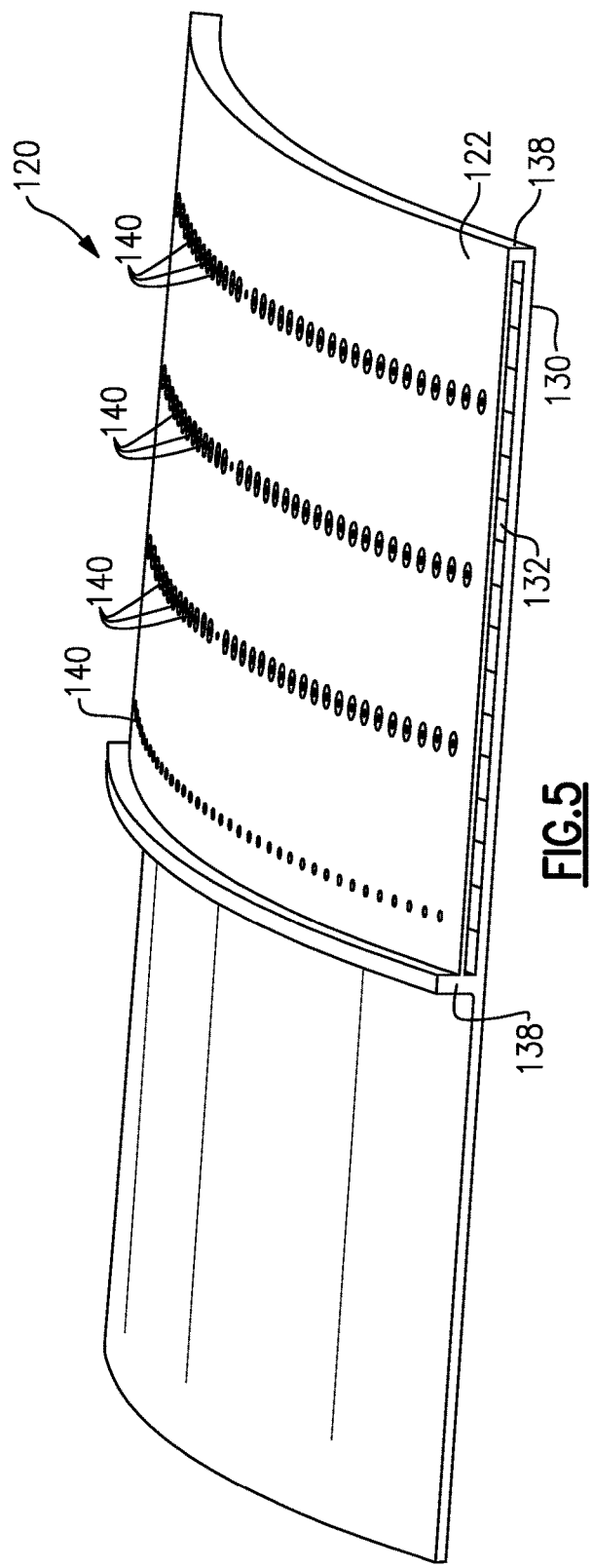
FIG. 5 is a perspective view of a combustor panel.
Figure 6:
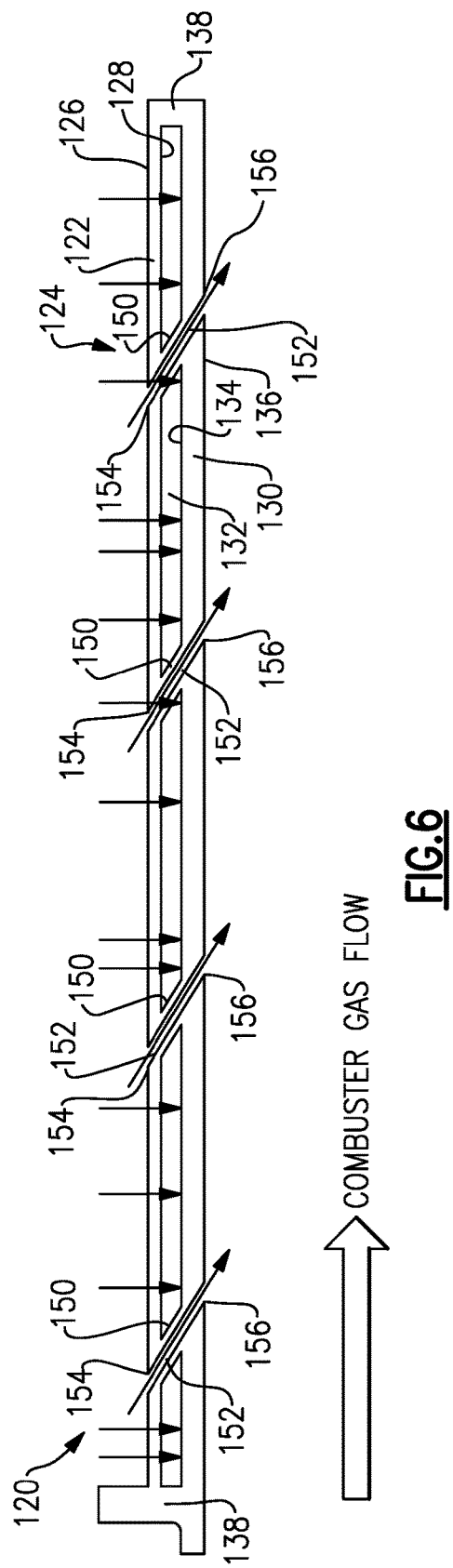
FIG. 6 is a side cross-sectional view of the combustor panel of FIG. 5.

Another example of a double-wall cooling circuit is shown in FIGS. 5-6. In this example, the cooling circuit is formed within a combustor panel 120. The combustor panel 120 includes a first wall 122 that faces a first cavity 124. The first wall 122 has a first surface 126 that faces the first cavity 124 and an opposite second surface 128 that faces away from the first cavity 124. The combustor panel 120 includes a second wall 130 spaced outwardly of the first wall 122 to provide a second cavity 132. The second wall 130 has a first surface 134 that faces the second cavity 132 and a second or external surface 136 that faces away from the second cavity 132. End walls 138 enclose ends of the second cavity 132.

A plurality of impingement holes 140 are formed within the first wall 122. In one example, the impingement holes 140 are arranged in rows. The holes 140 in each row are circumferentially spaced apart from each other, and the rows are axially spaced apart from each other. Other hole patterns and arrangements could also be used. The holes 140 direct air from the first cavity 124 in a first direction, radially inwardly, to impinge upon the first surface 134 of the second wall 130 for cooling purposes.

A plurality of pedestals 150 are formed to extend between the first 122 and second wall 130. A first end of each pedestal 150 is connected to, or formed as part of, the first wall 122 and a second opposite end of each pedestal 150 is connected to, or formed as part of, the second wall 130. Each pedestal 150 includes an internal cooling channel 152. Holes or openings 154 are formed within the first wall 122 and are aligned with the internal cooling channel 152 at the first end of the pedestal 150. In one example, the holes 154 are formed separately of the impingement holes 140.

Film holes 156 are formed within the second wall 130 and extend to the surface 136. An outlet from each internal cooling channel 152 at the second end of the pedestal 150 is aligned with one of the film holes 156. As such, the combustor panel 120 is subject to at least two different cooling flow paths. The first cooling flow path flows through the impingement holes 140 to cool the second wall 130. The second cooling flow path directs cooling flow from the first cavity 124, through the internal cooling channels 152 of the pedestals 150, and then exits via the film holes 156 to provide film cooling of the second wall 130.

In one example, the film cooling holes 156 define a flow direction that is obliquely orientated relative to the flow direction defined by the impingement holes 140. Other orientations of the pedestals 150 and internal cooling channels 152 could also be used.

Thus, in this configuration the double-wall cooling circuit is employed to convectively and film-cool the combustor panel 120. The combustor panel 120 uses row-based impingement flowing axially with pedestals 150 running through the post-impingement cavity supplying film cooling to the second wall 130 of the panel. As the impingement flow flows axially, the flow picks up significant amounts of heat. The additional cooling flow provided by the pedestals 150 allows for a gross decrease in the coolant temperature of the post impingement air, which increases convective efficiency.

The subject invention is directed to a cooling circuit configuration that includes a first wall having a first surface facing a first cavity and a second surface facing away from the first cavity, and a second wall spaced outwardly of the first wall to provide at least one second cavity. The walls can be formed as part of an airfoil section or a combustor panel, for example. The cooling fluid is configured to flow through the second cavity and exit to an external surface of the second wall of the component via at least one film hole to provide film cooling to the external surface. Thus, the subject invention utilizes double-wall cooling of a component with pedestals that cross an outward cavity and which are hollow such that cooling air is ejected on the surface to film cool the component. The use of the additional cooling feature through the pedestals allows for a gross decrease in the coolant temperature of the outward cavity, which results in an increase in convective efficiency. A comparison of the surface metal temperatures for configurations with the subject pedestals to those without the pedestals shows that there can be a significant decrease in max operating metal temperatures of the part.

The disclosed embodiments show different examples of pedestals as used in a blade or combustor panel. The pedestals could also be used in other components, such as vanes or blade outer air seals (BOAS) for example, to further augment heat transfer as needed.

Further, a prime method of construction for the subject cooling circuit uses an additive manufacturing process to create a negative for casting one or more features of the cooling circuit. The steps of the additive process include forming a first wall to have a first surface to face a first cavity and a second surface facing away from the first cavity, forming a second wall spaced outwardly of the first wall to provide at least one second cavity, forming a plurality of pedestals to extend between the first and second walls, with each pedestal having an internal cooling channel, and forming a film hole in an external surface of the second wall for each internal cooling channel such that cooling air is configured to flow through each internal cooling channel and exit from an associated film hole to provide film cooling to the external surface. As described above, the walls can be formed as part of a combustor panel, blade, vane, platform, turbine exhaust duct, or BOAS, for example.

For a secondary method of manufacture, such as metal-stamping of a refractory core or injection mold of ceramic core in a die, the pedestals are located within the negative formed by these two processes. In this configuration the pedestals will always be normal to the cavity flow direction commensurate with the action pressing the core. Using the prime method of construction leveraging an additive manufacturing process to form the cooling circuit allows the pedestals to be orientated at different angles relative to flow direction and/or relative to the first and second walls. For example, in FIG. 4 the pedestals extend obliquely relative to the axial flow through the outer wall cavities, while in FIGS. 5-6 the pedestals extend obliquely relative to the first and second combustor panel walls, to further increase the amount of surface area.

A tertiary manufacturing method of direct additive metal fabrication of the cooling circuit typically uses lasers or electron beams to sinter or melt particles in a multi-dimensional metal powder bed. In one example, the components are made by successively melting layers on top of each other to form the component. Other additive manufacturing processes and materials could also be used.

Using an additive process to create a metal part allows for extremely detailed, intricate, and adaptive feature configurations. This technology increases the design space of the components and allows for a much higher degree of manufacturing robustness and adaptability. It enables the elimination of costly manufacturing tooling and allows for a three dimensional definition of the component to be made to be the only tooling needed for storage.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A cooling circuit for a gas turbine engine comprising:
a first wall having a first surface facing a first cavity and a second surface facing away from the first cavity;
a second wall spaced from the first wall to provide at least one second cavity formed between the first and second walls, wherein the second wall includes an inner surface facing the second cavity and an external surface facing opposite the inner surface, and wherein cooling fluid is configured to flow from the first cavity and exit to the external surface of the second wall via at least one hole to provide cooling to the external surface;
at least one pedestal having a first end connected to the second surface of the first wall and a second end connected to the inner surface of the second wall such that the at least one pedestal extends across the at least one second cavity, the at least one pedestal including at least one internal cooling channel that fluidly connects the first cavity to the at least one hole at the external surface; and
wherein the at least one internal cooling channel comprises a plurality of internal cooling channels, wherein the at least one hole comprises a plurality of holes, and wherein the at least one pedestal comprises a plurality of pedestals each including at least one internal cooling channel of the plurality of cooling channels that exits to the external surface via at least one hole of the plurality of holes, and wherein the first end of each pedestal is connected to the second surface of the first wall and the second end of each pedestal is connected to the inner surface of the second wall, and wherein cooling fluid has a first flow path that flows through the at least one second cavity and around the pedestals and then exits directly to the external surface to provide a first flow path outlet and a second flow path that flows through the internal cooling channels of the pedestals from the first cavity to the plurality of holes at the external surface to provide a second flow path outlet.

2. The cooling circuit according to claim 1 wherein the first flow path comprises at least one of an axial or radial flow and wherein the second flow path is orientated at an oblique angle relative to the first flow path.

3. The cooling circuit according to claim 1 wherein the second wall is configured to provide an airfoil section, and wherein the first flow path outlet comprises a plurality of slots adjacent a trailing edge of the airfoil and wherein the plurality of holes comprises a plurality of film cooling holes that are spaced from the plurality of slots.

4. The cooling circuit according to claim 1 wherein the plurality of holes are formed in a pressure side of an airfoil.

5. A cooling circuit for a gas turbine engine comprising:
a first wall having a first surface facing a first cavity and a second surface facing away from the first cavity;
a second wall spaced from the first wall to provide at least one second cavity formed between the first and second walls, wherein the second wall includes an inner surface facing the second cavity and an external surface facing opposite the inner surface, and wherein cooling fluid is configured to flow from the first cavity and exit to the external surface of the second wall via at least one hole to provide cooling to the external surface;
at least one pedestal having a first end connected to the second surface of the first wall and a second end connected to the inner surface of the second wall such that the at least one pedestal extends across the at least one second cavity, the at least one pedestal including at least one internal cooling channel that fluidly connects the first cavity to the at least one hole at the external surface; and
wherein the first wall comprises an internal wall and the first cavity comprises a center cavity, and wherein the second wall comprises an outer wall and the second cavity comprises an outer wall cavity with the at least one pedestal being located within the outer wall cavity, and wherein the at least one hole comprises at least one film cooling hole, and wherein the cooling fluid has at least a first flow path and a second flow path that is separate from the first flow path, wherein the first flow path flows through the outer wall cavity, around the at least one pedestal, and exits the outer wall cavity directly to the external surface via a first flow path outlet, and wherein the second flow path flows from the center cavity, through the at least one internal cooling channel, and directly exits to the external surface via the at least one film cooling hole which comprises a second flow path outlet.

6. The cooling circuit according to claim 5 wherein the outer wall with the at least one film cooling hole comprises a hot exterior surface of an airfoil.

7. The cooling circuit according to claim 6 wherein the at least one pedestal comprises a plurality of pedestals each having the first end associated with the second surface of the internal wall and the second end associated with the inner surface of the outer wall, and wherein the at least one pedestal of the plurality of pedestals that includes the at least one internal cooling channel has the first end open to the center cavity and the second end open to the external surface via the at least one film cooling hole.

8. A gas turbine engine comprising:
a compressor section;
a combustor section downstream of the compressor section;
a turbine section downstream of the combustor section, and wherein at least one of the combustor section and the turbine section include a component having a first wall with a first surface facing a first cavity and a second surface facing away from the first cavity, and a second wall spaced from the first wall to provide at least one second cavity formed between the first and second walls, wherein the second wall includes an inner surface facing the second cavity and an external surface facing opposite the inner surface, and wherein cooling air is configured to flow from the first cavity and exit to the external surface of the second wall via at least one hole to provide cooling to the external surface, and including at least one pedestal having a first end connected to the second surface of the first wall and a second end connected to the inner surface of the second wall such that the at least one pedestal extends across the at least one second cavity, the at least one pedestal including at least one internal cooling channel that fluidly connects the first cavity to the at least one hole at the external surface; and
wherein the at least one hole comprises a plurality of holes, and wherein the at least one pedestal comprises a plurality of pedestals wherein the first end of each pedestal is connected to the second surface of the first wall and the second end of each pedestal is connected to the inner surface of the second wall and with at least one pedestal of the plurality of pedestals having the at least one internal cooling channel exiting to the external surface via the at least one hole such that cooling fluid has a first flow path that flows through the at least one second cavity and around the plurality of pedestals, and exits the second cavity directly to the external surface via a first flow path outlet, and including a second flow path that flows through the internal cooling channels of the plurality of pedestals from the first cavity and directly exits to the external surface via the plurality of holes which comprise a second flow path outlet.

9. The gas turbine engine according to claim 8 wherein the component comprises a combustor panel, blade outer air seal, airfoil platform, or turbine exhaust duct.

10. The gas turbine engine according to claim 9 wherein the first wall defines a first combustor panel portion and the second wall defines a second combustor panel portion, and wherein a distal end face of the first end of the at least one pedestal is connected to the second surface of the first wall and a distal end face of the second end of the at least one pedestal is connected to the inner surface of the second wall such that the at least one pedestal extends across the at least one second cavity, the at least one pedestal including the at least one internal cooling channel that fluidly connects the first cavity to the at least one hole at the external surface.

11. The gas turbine engine according to claim 10 wherein the at least one hole comprises a plurality of film cooling holes, and including a plurality of impingement cooling holes that are separate from the film cooling holes, wherein the plurality of impingement cooling holes direct cooling fluid toward the inner surface of the second combustor panel portion.

12. A gas turbine engine comprising:
a compressor section;
a combustor section downstream of the compressor section;
a turbine section downstream of the combustor section, and wherein at least one of the combustor section and the turbine section include a component having a first wall with a first surface facing a first cavity and a second surface facing away from the first cavity, and a second wall spaced from the first wall to provide at least one second cavity formed between the first and second walls, wherein the second wall includes an inner surface facing the second cavity and an external surface facing opposite the inner surface, and wherein cooling air is configured to flow from the first cavity and exit to the external surface of the second wall via at least one hole to provide cooling to the external surface, and including at least one pedestal having a first end connected to the second surface of the first wall and a second end connected to the inner surface of the second wall such that the at least one pedestal extends across the at least one second cavity, the at least one pedestal including at least one internal cooling channel that fluidly connects the first cavity to the at least one hole at the external surface; and
wherein the component comprises an airfoil, and wherein the cooling air has at least a first flow path and a second flow path that is separate from the first flow path, wherein the first flow path flows through the second cavity, around the at least one pedestal, and exits the second cavity directly to the external surface via a first flow path outlet, and wherein the second flow path flows from the first cavity, through the at least one internal cooling channel, and directly exits to the external surface via the at least one hole which comprises a second flow path outlet.

13. A method of forming a cooling circuit for a gas turbine engine comprising the steps of:
(a) forming a first wall of an airfoil to have a first surface facing a first cavity and a second surface facing away from the first cavity;
(b) forming a second wall spaced from the first wall to provide at least one second cavity formed between the first and second walls, wherein the second wall includes an inner surface facing the second cavity and an external surface facing opposite the inner surface;
(c) forming a plurality of pedestals with each pedestal having a first end extending from the second surface of the first wall to a second end at inner surface of the second wall, and wherein at least one pedestal of the plurality of pedestals has at least one internal cooling channel;
(d) forming a hole in the external surface of the second wall for each internal cooling channel such that cooling air is configured to flow from the first cavity, through each internal cooling channel, and then exit from the hole to provide cooling to the external surface, and wherein the cooling air has at least a first flow path and a second flow path that is separate from the first flow path, wherein the first flow path flows through the second cavity, around the at least one pedestal, and exits the second cavity directly to the external surface via a first flow path outlet, and wherein the second flow path flows from the first cavity, through the at least one internal cooling channel, and directly exits to the external surface via the at least one hole which comprises a second flow path outlet; and
(e) using a manufacturing process to create a negative for casting of features for at least one of the steps (a)-(d).

14. The method according to claim 13 wherein step (e) further includes successively adding layers of metal powder to form the cooling circuit.

15. The method according to claim 13 wherein step (e) includes providing an injection molded ceramic core or stamped refractory metal negative for at least one of the steps (a)-(d).

16. The method according to claim 13 wherein step (e) includes direct additive construction of at least one of the steps (a)-(d).

17. A method of forming a cooling circuit for a gas turbine engine comprising the steps of:
(a) forming a first wall having a first surface facing a first cavity and a second surface facing away from the first cavity;
(b) forming a second wall spaced from the first wall to provide at least one second cavity formed between the first and second walls, wherein the second wall includes an inner surface facing the second cavity and an external surface facing opposite the inner surface, wherein the first wall defines a first combustor panel portion and the second wall defines a second combustor panel portion;
(c) forming a plurality of pedestals with each pedestal having a first end extending from the second surface of the first wall to a second end at the inner surface of the second wall, and wherein at least one pedestal of the plurality of pedestals has at least one internal cooling channel, and wherein a distal end face of the first end of the at least one pedestal is formed as part of the second surface of the first wall and a distal end face of the second end of the at least one pedestal is formed as part of the inner surface of the second wall such that the at least one pedestal extends across the at least one second cavity;

(d) forming a hole in the external surface of the second wall for each internal cooling channel such that cooling air is configured to flow from the first cavity, through each internal cooling channel, and then exit from the hole to provide cooling to the external surface; the at least one pedestal including the at least one internal cooling channel that fluidly connects the first cavity to the at least one hole at the external surface; and (e) using a manufacturing process to create a negative for casting of features for at least one of the steps (a)-(d).

18. A cooling circuit for a gas turbine engine comprising:
a first wall having a first surface facing a first cavity and a second surface facing away from the first cavity;
a second wall spaced from the first wall to provide at least one second cavity formed between the first and second walls, wherein the second wall includes an inner surface facing the second cavity and an external surface facing opposite the inner surface, and wherein cooling fluid is configured to flow from the first cavity and exit to the external surface of the second wall via at least one hole to provide cooling to the external surface, and wherein the first wall defines a first combustor panel portion and the second wall defines a second combustor panel portion; and
at least one pedestal having a first end and a second end, wherein the first end of each pedestal is formed as part of the first wall and the second end of each pedestal is formed as part of the second wall such that the at least one pedestal extends across the at least one second cavity, the at least one pedestal including at least one internal cooling channel that fluidly connects the first cavity to the at least one hole at the external surface.

19. The cooling circuit according to claim 18 wherein the pedestal is positioned within the second cavity such that a distal end face of the first end of the at least one pedestal is connected to the second surface of the first wall and a distal end face of the second end of the at least one pedestal is connected to the inner surface of the second wall.

20. The cooling circuit according to claim 19 wherein the at least one pedestal comprises a plurality of pedestals each having the distal end face of the first end connected to the second surface of the first combustor panel portion and the distal end face of the second end connected to the inner surface of the second combustor panel portion, and wherein the at least one pedestal of the plurality of pedestals includes the at least one internal cooling channel that has the first end open to the first cavity and the second end open to the external surface of the second combustor panel portion via the at least one hole.

21. The cooling circuit according to claim 20 wherein the at least one hole comprises a plurality of film cooling holes, and including a plurality of impingement cooling holes that are separate from the film cooling holes, wherein the plurality of impingement cooling holes direct cooling fluid toward the inner surface of the second combustor panel portion.

22. The cooling circuit according to claim 21 wherein the impingement cooling holes define a first flow direction and the film cooling holes define a second flow direction that is obliquely orientated relative to the first flow direction.

23. The cooling circuit according to claim 19 including end walls that are axially spaced apart from each other to enclose ends of the second cavity.

* * * * *